United States Patent
Werner et al.

(10) Patent No.: US 11,764,922 B2
(45) Date of Patent: Sep. 19, 2023

(54) WIRELESS DEVICE, A NETWORK NODE AND METHODS THEREIN FOR ENABLING AND DETERMINING REFERENCE SIGNAL CONFIGURATIONS IN A WIRELESS COMMUNICATIONS NETWORK

(71) Applicant: Telefonaktiebolaget LM Ericsson (publ), Stockholm (SE)

(72) Inventors: Karl Werner, Segeltorp (SE); Esther Sienkiewicz, Ottawa (CA); Oskar Nordmark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 16/957,127

(22) PCT Filed: Mar. 20, 2018

(86) PCT No.: PCT/SE2018/050273
§ 371 (c)(1),
(2) Date: Jun. 23, 2020

(87) PCT Pub. No.: WO2019/182486
PCT Pub. Date: Jun. 26, 2019

(65) Prior Publication Data
US 2020/0351053 A1   Nov. 5, 2020

(51) Int. Cl.
*H04L 5/00* (2006.01)
*H04L 25/02* (2006.01)

(52) U.S. Cl.
CPC ........ *H04L 5/0048* (2013.01); *H04L 25/0226* (2013.01)

(58) Field of Classification Search
CPC .......................... H04L 5/0048; H04L 25/0226
See application file for complete search history.

(56) References Cited

U.S. PATENT DOCUMENTS

| 7,162,203 B1* | 1/2007 | Brunner | H04W 16/06 455/67.11 |
| 10,171,159 B1* | 1/2019 | Tailor | H04L 5/006 |

(Continued)

FOREIGN PATENT DOCUMENTS

| WO | 2014113971 A1 | 7/2014 |
| WO | 2014126519 A1 | 8/2014 |
| WO | 2015038057 A1 | 3/2015 |

OTHER PUBLICATIONS

First Examination Report dated Aug. 6, 2021 for Indian Patent Application No. 202047026572, 6 pages.
(Continued)

*Primary Examiner* — Zhiren Qin
(74) *Attorney, Agent, or Firm* — SAGE PATENT GROUP

(57) ABSTRACT

A method performed by a wireless device for enabling a determination of a reference signal configuration for downlink transmissions in a wireless communications network is provided. The wireless device obtains information indicating the number of used transform coefficients of the total number of transform coefficients determined in a transform-based channel estimator in the wireless device upon receiving a first downlink transmission according to a first reference signal configuration. Also, the wireless device determines, based on the obtained information, if the first reference signal configuration for downlink transmissions to the wireless device is to be modified or not. A wireless device for enabling a determination of a reference signal configuration for downlink transmissions in a wireless communications network is also provided. Further, a network node and method therein for determining a reference signal configuration for transmissions in a wireless communications network are provided.

16 Claims, 11 Drawing Sheets

(56) References Cited

U.S. PATENT DOCUMENTS

| | | | |
|---|---|---|---|
| 2003/0031238 A1* | 2/2003 | Li | H04B 1/7077 |
| | | | 375/147 |
| 2003/0068984 A1* | 4/2003 | Shin | H04W 52/226 |
| | | | 455/69 |
| 2004/0192371 A1* | 9/2004 | Zhao | H04W 52/247 |
| | | | 455/69 |
| 2009/0245214 A1 | 10/2009 | Mudulodu et al. | |
| 2009/0303946 A1* | 12/2009 | Yokoyama | H04L 5/0048 |
| | | | 370/329 |
| 2011/0002256 A1* | 1/2011 | Chien | H04L 5/0048 |
| | | | 370/329 |
| 2012/0300884 A1* | 11/2012 | You | H04L 27/2633 |
| | | | 375/340 |
| 2013/0235835 A1* | 9/2013 | Wang | H04B 7/0626 |
| | | | 370/329 |
| 2015/0304130 A1 | 10/2015 | Logothetis et al. | |
| 2019/0254054 A1* | 8/2019 | Wang | H04L 25/0224 |
| 2020/0092065 A1* | 3/2020 | Kuang | H04L 5/001 |
| 2020/0163052 A1* | 5/2020 | Ko | H04N 21/4385 |

OTHER PUBLICATIONS

PCT International Search Report and Written Opinion dated Dec. 14, 2018 for International Application No. PCT/SE2018/050273, 9 pages.

NTT Docomo, Inc., 3GPP TSG RAN WG1 Meeting #85, R1-165178, "Views on Domodulation RS Design for NR Access Technology", Nanjing, P. R. China, May 23-27, 2016, 7 pages.

Ericsson, 3GPP TSG RAN WG1 Meeting #84bis, R1-163227, "Numerology for NR", Busan, Apr. 11-15, 2016, 14 pages.

\* cited by examiner

WIRELESS DEVICE, A NETWORK NODE AND METHODS THEREIN FOR ENABLING AND DETERMINING REFERENCE SIGNAL CONFIGURATIONS IN A WIRELESS COMMUNICATIONS NETWORK

CROSS-REFERENCE TO RELATED APPLICATIONS

This application is a 35 U.S.C. § 371 national stage application for International Application No. PCT/SE2018/050273, entitled "A WIRELESS DEVICE, A NETWORK NODE AND METHODS THEREIN FOR ENABLING AND DETERMINING REFERENCE SIGNAL CONFIGURATIONS IN A WIRELESS COMMUNICATIONS NETWORK", filed on Mar. 20, 2018, the disclosures and contents of which are hereby incorporated by reference in their entireties.

TECHNICAL FIELD

Embodiments herein relate to reference signal configuration in a wireless communications network. In particular, embodiments herein relate to wireless device and method therein for enabling a determination of a reference signal configuration for downlink transmissions in a wireless communications network. Also, embodiments herein relate to network nodes and methods therein for determining reference signal configurations for downlink and uplink transmissions in a wireless communications network.

BACKGROUND

A wireless communications network conventionally comprises radio base stations, also referred to as network nodes, providing radio coverage over at least one respective geographical area forming a so-called cell or coverage area. Wireless devices, also referred to herein as User Equipments, UEs, mobile stations, and/or wireless terminals, are served in the cells by the respective radio base station. The wireless devices transmit data over an air or radio interface to the radio base stations in uplink, UL, transmissions and the radio base stations transmit data over an air or radio interface to the wireless devices in downlink, DL, transmissions. In today's wireless communications networks a number of different possible technologies may be used, such as, for example, 5G/New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB). One of the technologies for a wireless communications network that is currently being worked on is the 5G or New Radio (NR) system architecture.

Similar to LTE, 5G/NR will depend on Reference Signals, RS, for channel estimation and demodulation of data information, i.e. both payload data information and control data information, of transmitted signals. The RS allows the receiver, whether in the wireless device or in the network node, to characterize the radio channel in such a way that its effect on the modulation symbols of the RS, i.e. RS symbols, and of the payload data information may be predicted and therefore reversed. The RS symbols are typically distributed in the time, frequency, code, and antenna domains according to a RS configuration.

Furthermore, 5G/NR is expected to employ a flexible air interface that may be deployed in many different types of scenarios which may comprise at least some of the following characteristics:
- a flexible Time Transmission Interval, TTI, duration, including both very short and very long TTIs;
- operation under high Doppler and high delay spread, as well as in low Doppler, low delay spread scenarios;
- early decoding of data, i.e. when latency requirements dictate it;
- a family of Orthogonal Frequency-Division Multiplexing, OFDM, numerologies, which may comprise different subcarrier spacings;
- communication at extremely low Signal-to-Noise Ratio, SNR, such as, for example, in certain massive-Machine Type Communication, mMTC, scenarios;
- communication at extremely high SNR, such as, for example, if the 5G/NR system is deployed as wireless backhaul in Line-of-Sight, LoS, scenarios or in certain indoor scenarios;
- very large antenna arrays with UE specific beamforming;
- different means for Channel State Information, CSI, acquisition, including reciprocity-based solutions and feedback-based solutions;
- convergence between UL, sidelink, and DL transmissions;
- transmission at a wide range of data rates, which may include varying bandwidths, modulation schemes, Multiple Input Multiple Output, MIMO, orders, and code rates;
- very reliable transmissions;
- high spectral efficiency;
- self-contained subframes, i.e. self-contained with regards to RS.

In order to properly address these different types of scenarios, a large set of RS configurations have been specified for 5G/NR. A reason for this is that Common Reference Signals, CRS, are no longer available in 5G/NR. In previous wireless communications network technologies, such as, e.g. LTE, CRS was broadcasted continuously to all wireless devices to be used for the channel estimation and demodulation of data information of the transmitted signals. Hence, the channel estimation and demodulation of data information in transmitted signals in 5G/NR must now instead be performed using other RS, such as, e.g. demodulation reference signals, DMRS. Therefore, the different RS configurations specified for 5G/NR may differ in RS density, i.e. the number of RS symbols used by each RS configuration. The RS density may differ both in time and frequency direction. The RS density of the RS configuration will also have a large effect on channel estimation performance. However, it has been noted that current solutions do not take advantage of the flexibility provided through the use of these different RS configurations.

SUMMARY

It is an object of embodiments herein to improve the use of different reference signal configurations in a wireless communications network.

According to a first aspect of embodiments herein, the object is achieved by a method performed by a wireless device for enabling a determination of a reference signal configuration for downlink transmissions in a wireless communications network. According to the method, the wireless device obtains information indicating the number of used transform coefficients of the total number of transform coefficients determined in a transform-based channel estimator in the wireless device upon receiving a first downlink transmission according to a first reference signal configuration. The wireless device also determines, based on the obtained information, if the first reference signal configuration for downlink transmissions to the wireless device is to be modified or not.

According to a second aspect of embodiments herein, the object is achieved by a wireless device for enabling a determination of a reference signal configuration for downlink transmissions in a wireless communications network. The wireless device is configured to obtain information indicating the number of used transform coefficients of the total number of transform coefficients determined in a transform-based channel estimator in the wireless device upon receiving a first downlink transmission according to a first reference signal configuration. The wireless device is also configured to determine, based on the obtained information, if the first reference signal configuration for downlink transmissions to the wireless device is to be modified or not.

According to a third aspect of embodiments herein, the object is achieved by a method performed by a network node for determining a reference signal configuration for downlink transmissions in a wireless communications network. According to the method, the network node obtains information indicating if a first reference signal configuration for downlink transmissions to a wireless device is to be modified or not. The network node also determines a second reference signal configuration for downlink transmissions to the wireless device based on the received information.

According to a fourth aspect of embodiments herein, the object is achieved by a network node for determining a reference signal configuration for downlink transmissions in a wireless communications network. The network node is configured to obtain information indicating if a first reference signal configuration for downlink transmissions to a wireless device is to be modified or not. The network node is also configured to determine a second reference signal configuration for downlink transmissions to the wireless device based on the received information.

According to a fifth aspect of embodiments herein, the object is achieved by a method performed by a network node for determining a reference signal configuration for uplink transmissions in a wireless communications network. According to the method, the network node obtains information indicating the number of used transform coefficients of the total number of transform coefficients determined in a transform-based channel estimator in the network node upon receiving an uplink transmission according to a first reference signal configuration. The network node also determines a second reference signal configuration for uplink transmissions in the wireless communications network based on the obtained information. Further, the network node configures a wireless device for uplink transmissions according to the determined second reference signal configuration.

According to a sixth aspect of embodiments herein, the object is achieved by a network node for determining a reference signal configuration for uplink transmissions in a wireless communications network. The network node is configured to obtain information indicating the number of used transform coefficients of the total number of transform coefficients determined in a transform-based channel estimator in the network node upon receiving an uplink transmission according to a first reference signal configuration. The network node is also configured to determine a second reference signal configuration for uplink transmissions in the wireless communications network based on the obtained information. Further, the network node is configured to configure a wireless device for uplink transmissions according to the determined second reference signal configuration.

According to a seventh aspect of the embodiments herein, a computer program is also provided configured to perform the method described above. Further, according to an eight aspect of the embodiments herein, carriers are also provided containing the computer program.

By allowing a wireless device to determine whether or not the reference signal configuration used in DL transmissions should be modified or not based on the number of used transform coefficients in a transform-based channel estimator, the wireless device is able to adapt the reference signal configuration based on a suitable already existing channel estimation parameter. This is because the number of used transform coefficients in the transform-based channel estimator provides an indication of how well the transform-based channel estimator is able to suppress noise for the current reference signal configuration used in the DL transmissions. Similarly, this may be performed by a network node for UL transmissions; that is, by allowing a network node to determine whether or not the reference signal configuration used in DL transmissions should be modified or not based on the number of used transform coefficients in a transform-based channel estimator, the network node is also able to adapt the reference signal configuration based on a suitable already existing channel estimation parameter. In addition, a similar procedure may also be performed by the network node for DL transmissions. This enables the reference signal configurations used in both UL and DL transmissions to be effectively adapted to changing channel conditions and service requirements without adding any significant computational complexity. Hence, the use of different reference signal configurations in a wireless communications network is improved. Further possible features and benefits of this solution will become apparent from the detailed description below.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
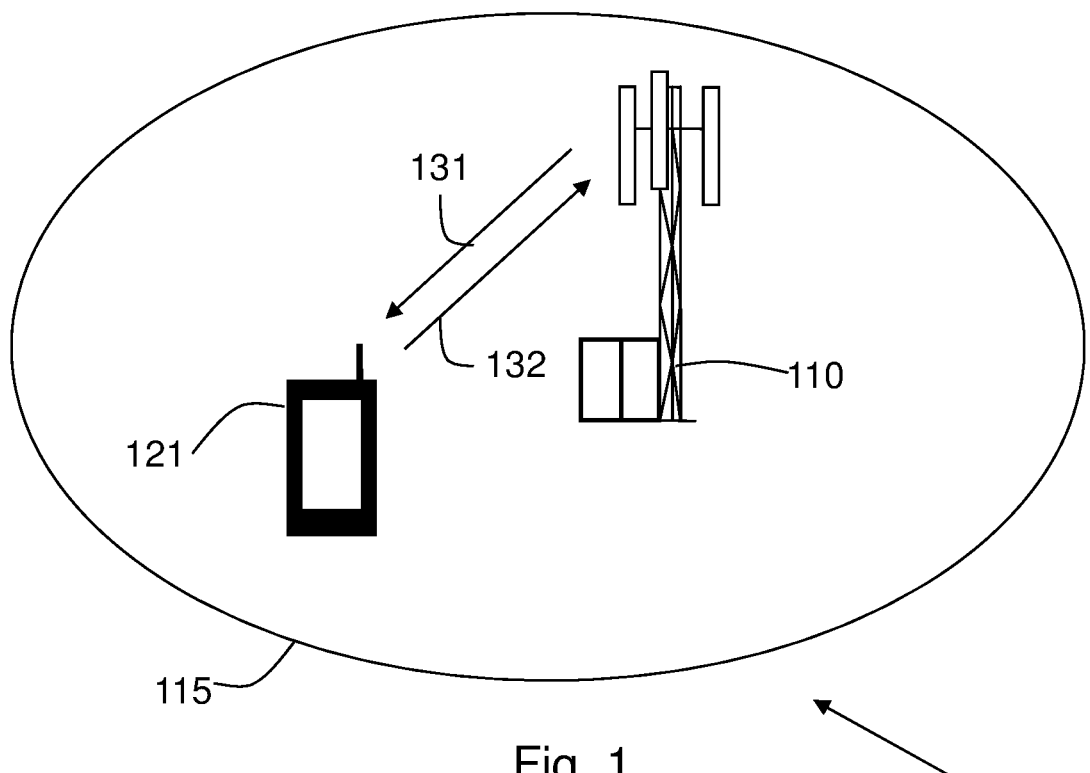
FIG. 1 is a schematic block diagram illustrating embodiments of a wireless device and a network node in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless communications network 100 in which embodiments herein may operate. In some embodiments, the wireless communications network 100 may be a radio communications network, such as, 5G/NR network. Although, the wireless communications network 100 is exemplified herein as an 5G/NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

In FIG. 1, a wireless device 121 is located within the cell 115. The wireless device 121 is configured to communicate within the wireless communications network 100 via the network node 110 over a radio link served by the network node 110. Utilizing the radio link, a bi-directional communications flow may be set up between the wireless device 121 and any entity capable of communication via the wireless communications network 100. The wireless device 121 may transmit data over an air or radio interface to the radio base station 110 in uplink, UL, transmissions 132 and the radio base station may transmit data over an air or radio interface to the wireless devices in downlink, DL, transmissions 131. The wireless device 121 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication.

The channel estimation and demodulation of data information in both UL and DL transmissions in the wireless communications network 100 is performed by the wireless device 121 and the network node 110 based on the modulation symbols, i.e. RS symbols, of the Reference Signal, RS, present in respective UL and DL transmissions. The number of RS symbols, i.e. RS density, may be determined by a configuration of the RS, i.e. RS configuration, for the UL and DL, respectively. The RS configuration may be set for the UL and DL by the network node 110 using control signalling. According to some embodiments, the RS may be Demodulation Reference Signals, DMRS. However, it should be noted that the RS may also comprise other types of RS, such as, e.g. SRS, CSI-RS, PT-RS or TRS. Furthermore, although embodiments below are described with reference to FIG. 1, this should not be construed as limiting to the embodiments herein, but merely as an example made for illustrative purposes.

As part of the developing of the embodiments described herein, it has been realized that, as opposed to implementing a large set of different RS configurations, a fixed RS configuration may instead be envisioned and configured in the wireless communications network. However, such a fixed RS configuration would then need to be selected so as to be able to offer acceptable demodulation performance in the most challenging conditions expected in the coverage area. This would inevitably lead to a high RS symbol overhead resulting in reduced performance in the wireless communications network during other less challenging conditions in the coverage area.

It has also been realized that it in many cases may be feasible to implement efficient transform-based channel estimators, such as, for example, channel estimators based on Discrete Cosine Transform, DCT, since some of the different RS configurations specified for 5G/NR are configured to use regularly spaced frequency sampling, also commonly referred to as a frequency comb.

In view of the above, the issue of which RS configuration to use in a given scenario is addressed by the embodiments herein. According to one aspect, a wireless device determines whether or not a RS configuration used in DL transmissions should be modified or not based on how well its transform-based channel estimator is able to suppress noise in the DL transmission. Similarly, according to another aspect, a network node determines whether or not a RS configuration used in a DL or UL transmission should be modified or not based on how well its transform-based channel estimator is able to suppress noise for respective transmissions. In other words, embodiments presented herein suggest using an existing quantity (which is anyway computed as part of the transform-based channel estimation algorithms in the wireless communications network, such as, e.g. a selected window length) in order to determine if the RS density should be increased or decreased, e.g. by selecting another RS configuration than the one currently being used and which comprises a higher or lower RS density. In particular, if applied for DL transmissions, the wireless device may, for example, signal to the network node that an increased or decreased RS density is desired whereby the network node may respond by selecting another RS configuration. Correspondingly, if applied for UL transmissions, the network node may determine whether or not an increase or decrease in RS density is desired and then maybe respond by selecting and using another RS configuration. Embodiments of the wireless device 121, the network node 110 and methods therein will be described in more detail below with reference to FIGS. 2-10.

Figure 2:
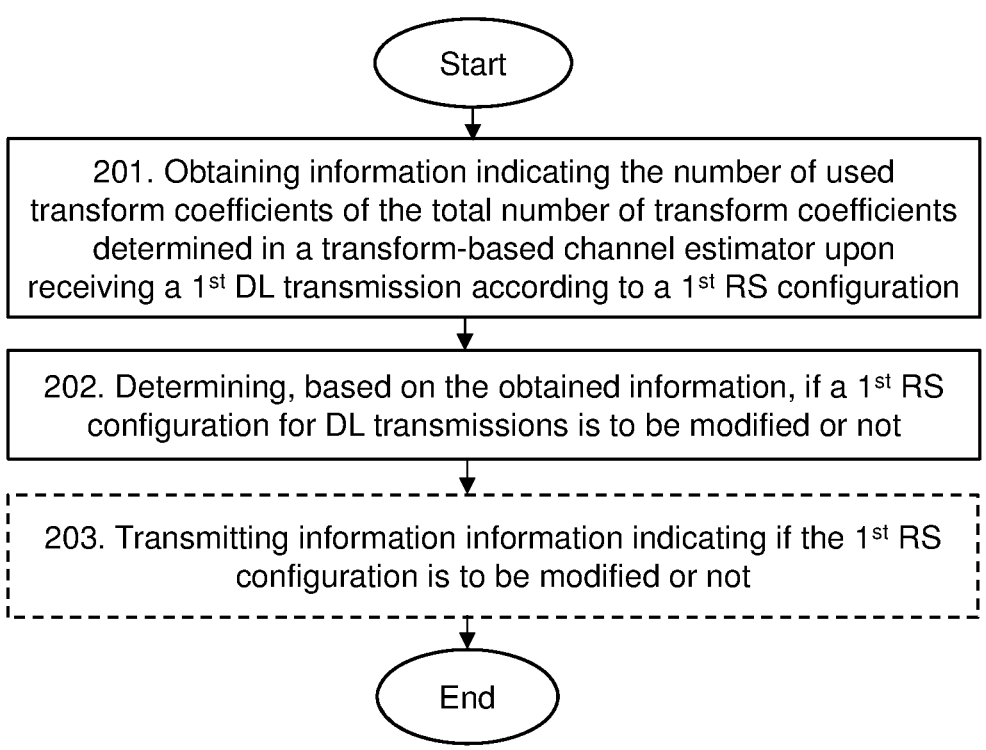
FIG. 2 is a flowchart depicting embodiments of a method in a wireless device.

Embodiments of a method performed by a wireless device 121 for enabling a determination of a RS configuration for DL transmissions in a wireless communications network 100 will now be described with reference to the flowchart depicted in FIG. 2. FIG. 2 is an illustrated example of actions or operations which may be performed by a wireless device 121 in the wireless communication network 100. It should be noted that prior to Action 201, the wireless device 121 may receive a first DL transmission. Upon receiving the first DL transmission, the wireless device 121 may perform demodulation and filtering of the RS comprised in the first DL transmission according to the current RS configuration. Then, the wireless device 121 may perform a channel estimation based on the demodulated and filtered RS. This may be performed by a transform-based channel estimator in the wireless device 121, e.g. a channel estimator based on FFT or DCT.

Action 201. The wireless device 121 may obtain information indicating the number of used transform coefficients of the total number of transform coefficients determined in a transform-based channel estimator in the wireless device 121 upon receiving a first DL transmission according to a first RS configuration. This means, for example, that the wireless device 121 may utilize the fact that the number of used transform coefficients provide an indication of how well the transform-based channel estimator is able to suppress noise in the DL transmission. The number of used transform coefficients is the transform coefficients filtered out from the total number of transform coefficients as containing a significant amount of signal energy by the transform-based channel estimator, while the transform coefficients not being used are filtered out from the total number of transform coefficients as predominantly containing noise. This filtering may be performed by the transform-based channel estimator by a window length selected in the transform-based channel estimator in the wireless device 121. The window length may be selected by the transform-based channel estimator based on a classification of the transform coefficients as containing either signal energy or predominantly noise. This may be performed by using the Aikake information criteria or similar. Thus, the number of used transform coefficients is given by the selected window length of the transform-based channel estimator. Hence, in some embodiments, the number of used transform coefficients may be based on a window length selected in the transform-based channel estimator in the wireless device 121. It should be noted that the number of used transform coefficients in the transform-based channel estimator may further be a trade-off performed by the transform-based channel estimator between suppressing noise, i.e. keeping as few transform coefficients as possible, and maintaining the properties of the radio channel, i.e. keeping enough transform coefficients.

In some embodiments, the wireless device 121 may determine a channel estimate quality indicator which indicates how well the channel estimate of the transform-based channel estimator corresponds to the actual channel. Here, it should be noted that the channel estimate quality indicator may, in addition to be based on the number of used transform coefficients in the transform-based channel estimator, further also be based on or depend on additional factors. For example, results from other filtering steps in the transform-based channel estimator may be used to determine an overall processing gain of the transform-based channel estimator, which then may be used to determine a channel estimate quality indicator.

In some embodiments, the channel estimate quality indicator may be based on the number of used transform coefficients and the total number of transform coefficients determined in the transform-based channel estimator. One example of such a channel estimate quality indicator may, for example, be the ratio between the number of used transform coefficients and the total number of transform coefficients. This may also be referred to as a processing gain of the transform-based channel estimator. This processing gain is indicative of the transform-based channel estimator ability to suppress noise. A conventional use of this processing gain in some existing channel estimation algorithms is to determine whether or not the resulting channel estimates are useful for demodulation, i.e. the processing gain should be above a certain threshold value for the channel estimates to be used for the demodulation.

For example, if too many transform coefficients of the total number of transform coefficients are used by the transform-based channel estimator in the wireless device 121, then this may be indicated by the channel estimate quality indicator being below a determined threshold value, e.g. the processing gain being too low. In turn, this indicates that the RS density used in the first RS configuration should be increased, thus using more of the transmission resources for RS. On the other hand, if too few transform coefficients of the total number of transform coefficients are used by the transform-based channel estimator in the wireless device 121, i.e. the window length selected by transform-based channel estimator in the wireless device 121 is too short, then this may be indicated by the channel estimate quality indicator being above a determined threshold value, e.g. the processing gain being too high. In turn, this indicates that the RS density used in the first RS configuration should be decreased, thus releasing transmission resources for payload data information instead.

Optionally, in some embodiments, the wireless device 121 may determine the channel estimate quality indicator further based on one or more previous numbers of used transform coefficients in the transform-based channel estimator obtained upon receiving other DL transmissions prior to the first DL transmission. This means that historic data or values of the number of used transform coefficients in the transform-based channel estimator when processing previous DL transmission, i.e. DL transmissions received by the wireless device 121 before the first DL transmission, also may be used to determine the channel estimate quality indicator. For example, the historic data or values of the number of used transform coefficients may be weighted in together with the current number of used transform coefficients when determining the channel estimate quality indicator. Also, according to another example, a self-learning operation or algorithm may be employed which may consider both current data or value of the number of used transform coefficients along with the historic data or values of the number of used transform coefficients when determining the channel estimate quality indicator.

In some embodiments, in case the first RS configuration is such that the RS is present at multiple time instances and the number of used transform coefficients in the transform-based channel estimator is selected per time instance, the wireless device 121 may use the number of used transform coefficients selected in each of these time instances when determining the channel estimate quality indicator. The multiple time instances may, for example, be two or more OFDM symbols within a resource block, a slot, and/or a subframe. For example, the selection in the transform-based channel estimator in the wireless device 121 of the number of used transform coefficients may be done independently for two OFDM symbols, which thus may indicate different values of the number of transform coefficients. However, these two different values of the number of used transform coefficients may together serve as a basis to indicate if the overall processing gain, for example, is too low or too high. Furthermore, in this case, it may also be noted that the number of time instances comprising RS will also affect the processing gain. This means that the number of used transform coefficients may be higher in the DCT, and hence a lower RS density may be acceptable when many time instances are available.

Action 202. After obtaining the information in Action 201, the wireless device 121 determines, based on the obtained information, if the first RS configuration for DL transmissions to the wireless device 121 is to be modified or not. This means that the wireless device 121 may determine that the first RS configuration for DL transmissions should be modified, or not, based on the obtained information in Action 201. This also means that the wireless device 121 may determine if the first RS configuration for DL transmissions should be modified or not based on an existing quantity, i.e. the number of used transform coefficients or a channel estimate quality indicator determined based thereon.

In some embodiments, the wireless device 12 may determine that the first RS configuration is to be modified such that an increased or decreased amount of transmission resources is allocated to RS, or maintained for DL transmissions. This means that the number of used transform coefficients, or the determined channel estimate quality indicator, may be used by the wireless device 121 to determine if the amount of transmission resources allocated to RS according to the first RS configuration, e.g. the number of REs allocated to RS symbols, was too low, too high, or well-balanced for receiving the first DL transmission. This means that if the amount of transmission resources allocated to RS according to the first RS configuration is determined as well-balanced for receiving the first DL transmission, then there is no need for any modification of first RS configuration. On the other hand, if the amount of transmission resources allocated to RS according to the first RS configuration is determined as too low or too high for receiving the first DL transmission, then there is a need to modify the first RS configuration. This determination may be performed in the wireless device 121 by, for example, comparing the number of used transform coefficients or the determined channel estimate quality indicator to threshold values configured in the wireless device 121 for the number of used transform coefficients or channel estimate quality indicators. Optionally, the wireless device 121 may pair or map specific amounts of transmission resources allocated to RS with specific numbers of used transform coefficients.

In some embodiments, the amount of transmission resources allocated to RS may correspond to one or more of: a number of Resource Elements, REs, allocated to symbols of the RS; a transmit power allocation for one or more of the symbols of the RS; and a coding level used for the symbols of the RS. This means that the wireless device 121 may explicitly determine which transmission resources that it considers are needed to be modified in the RS configuration for DL transmissions.

Action 203. Optionally, after the determination in Action 202, the wireless device 121 may transmit information indicating if the first RS configuration is to be modified or not to a network node 110 of the wireless communications network 100. This means that the wireless device 121 may notify the network node 110 about whether or not the first RS configuration should be modified; thus, enabling the network node 110 to determine whether or not to modify the first RS configuration. The notification by the wireless device 121 may, for example, be performed using RRC or UCI signalling.

In some embodiments, the transmitted information may comprise the channel estimate quality indicator. Alternatively, or additionally to comprising a channel estimate quality indicator, the transmitted information may comprise other information indicating that the amount of transmission resources allocated to RS is to be increased or decreased, or maintained for DL transmissions. This means that the wireless device 121 may implicitly indicate that the first RS configuration is to be modified or not, e.g. by providing a determined channel estimate quality indicator, the number of used transform coefficients, and/or the selected window length. Furthermore, it also means that the wireless device 121 also explicitly may indicate that the first RS configuration is to be modified or not. This may be performed by providing explicit information indicating whether to increase, maintain or decrease the amount of transmission resources in the first RS configuration, such as, e.g. by using a dedicated bit. According to one option, this may be performed by providing information indicating how much the amount of transmission resources allocated to RS should be increased or decreased, e.g. a recommendation of an RS density in absolute or relative terms. It should also be noted that in case the wireless device 121 determines that the first RS configuration is not to be modified, but instead maintained for the DL transmission, the wireless device 121 may refrain from transmitting any notifications to the network node 110.

Figure 3A:
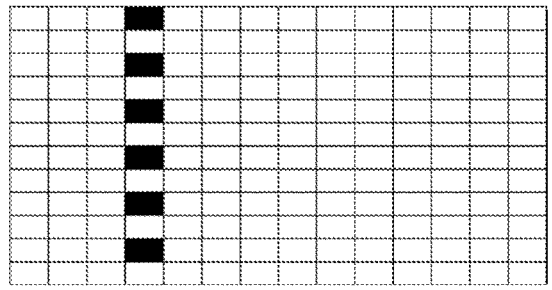
FIGS. 3A-3F are illustrations depicting different reference signal configurations.
Figure 3B:
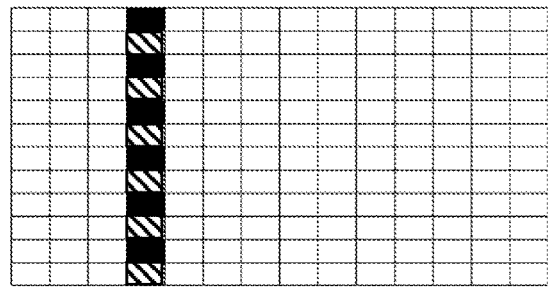
Figure 3C:
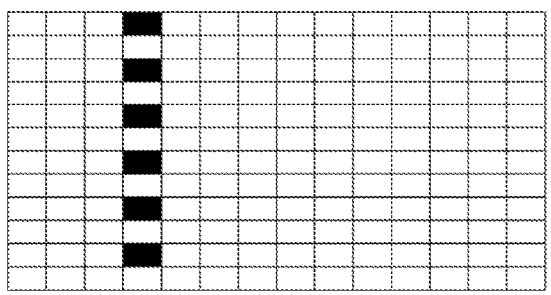
Figure 3D:
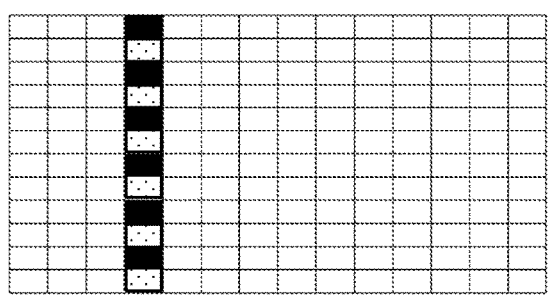
Figure 3E:
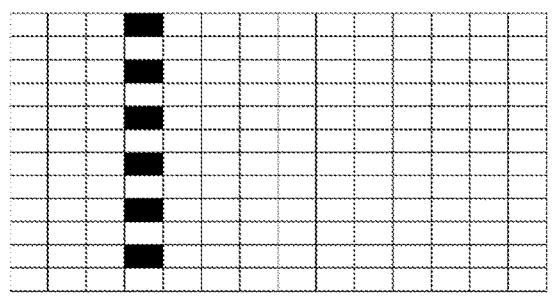
Figure 3F:
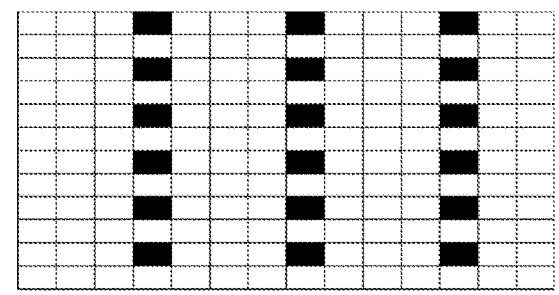

FIGS. 3A-3F shows illustrations depicting different RS configurations that have been specified for 5G/NR and which may be used in the different embodiments described herein. FIGS. 3A-3D illustrates different RS densities in the frequency domain, while FIGS. 3E-3F illustrates different RS densities in the time domain.

For the purpose of understanding the different RS configurations in FIGS. 3A-3F, it should be noted that a basic DL physical resource may thus be seen as a time-frequency grid. In the time-frequency grid, each Resource Element (RE) corresponds to one OFDM subcarrier during one OFDM symbol interval. In FIGS. 3A-3F, OFDM subcarriers are defined along the y-axis and OFDM symbols are defined along the x-axis. Furthermore, the resource allocation may typically described in terms of Resource Blocks (RBs), where an RB corresponds to 14 OFDM symbols (with normal cyclic prefix) in the time domain and 12 OFDM subcarriers in the frequency domain. FIGS. 3A-3F each show two slots or two RBs.

FIG. 3A illustrates a RS configuration in a RB, according to 3GPP TS 38.212, version 15.0.0, Table 7.3.2.2-1, suitable for Rank 2 with a low RS density. The RS symbols are allocated 50% of the REs in OFDM symbol #4, denoted by the fully marked or blackened REs in FIG. 3A. The remaining REs in OFDM symbol #4 and the other OFDM symbols in the RB, denoted by the non-marked or blank REs in FIG. 3A, may be used for other data information, such as, e.g. PDSCH data in DL transmissions or PUSCH data in UL transmissions. In this case, the RS symbols in the fully marked or blackened REs in FIG. 3A may be utilized, e.g. by both Antenna Ports (APs) 1000 and 1001. FIG. 3B illustrates a RS configuration in a Resource Block, RB, according to 3GPP TS 38.212, version 15.0.0, Table 7.3.2.2-1, suitable for Rank 2 with a high RS density. The RS symbols are allocated 100% of the REs in OFDM symbol

4, denoted by the fully marked or blackened REs and the dashed marked REs in FIG. 3B. The remaining REs in the other OFDM symbols in the RB, denoted by the non-marked or blank REs in FIG. 3B, may be used for other data information. In this case, RS symbols in the fully marked or blackened REs in FIG. 3B may be utilized, e.g. by AP 1000, and the RS symbols in the dashed marked REs in FIG. 3B may be utilized, e.g. by AP 1002.

FIG. 3C illustrates a RS configuration in a RB, according to 3GPP TS 38.212, version 15.0.0, Table 7.3.2.2-1, suitable for Rank 1 with a low RS density. The RS symbols are allocated 50% of the REs in OFDM symbol #4, denoted by the fully marked or blackened REs in FIG. 3C. The remaining REs in OFDM symbol #4 and the other OFDM symbols in the RB, denoted by the non-marked or blank REs in FIG. 3C, may be used for other data information, such as, e.g. PDSCH data in DL transmissions or PUSCH data in UL transmissions. Also, the RS symbols in fully marked or blackened REs in FIG. 3C may be utilized, e.g. by the single AP 1000. FIG. 3D illustrates a RS configuration in a RB, according to 3GPP TS 38.212, version 15.0.0, Table 7.3.2.2-1, suitable for Rank 1 with a high RS density. The RS symbols are allocated 100% of the REs in OFDM symbol #4, denoted by the fully marked or blackened REs and the dotted marked REs in FIG. 3D. The remaining REs of the other OFDM symbols in the RB, denoted by the non-marked or blank REs in FIG. 3D, may be used for other data information. In this case, the RS symbols in the fully marked or blackened REs in FIG. 3D may be utilized, e.g. by AP 1000, while the dotted marked REs in the RB in FIG. 3D may be used to boost RS power. This means that these REs are allocated to RS, but do not contain any RS symbols, which allows the power of the RS symbols in the fully marked or blackened REs in FIG. 3D to be boosted.

FIG. 3E illustrates a RS configuration in a RB, according to 3GPP TS 38.212, version 15.0.0, Table 7.4.1.1.2-3, suitable for Rank 1 with a low RS density. The RS symbols are allocated 50% of the REs in OFDM symbol #4, denoted by the fully marked or blackened REs in FIG. 3E. The remaining REs in OFDM symbol #4 and the other OFDM symbols in the RB, denoted by the non-marked or blank REs in FIG. 3E, may be used for other data information, such as, e.g. PDSCH data in DL transmissions or PUSCH data in UL transmissions. In this case, the RS symbols in the fully marked or blackened REs in FIG. 3E may be utilized, e.g. by both Antenna Ports (APs) 1000 and 1001. FIG. 3F illustrates a RS configuration in a RB, according to 3GPP TS 38.212, version 15.0.0, Table 7.4.1.1.2-3, suitable for Rank 1 with a high RS density. The RS symbols are allocated 50% of the REs in OFDM symbols #4, #8, and #12, denoted by the fully marked or blackened REs in FIG. 3F. The remaining REs in OFDM symbol #4, #8, and #12 and the other OFDM symbols, denoted by the non-marked or blank REs in FIG. 3F, may be used for other data information. In this case, the RS symbols in the fully marked or blackened REs in FIG. 3F may be utilized, e.g. by the single AP 1000.

Figure 4:
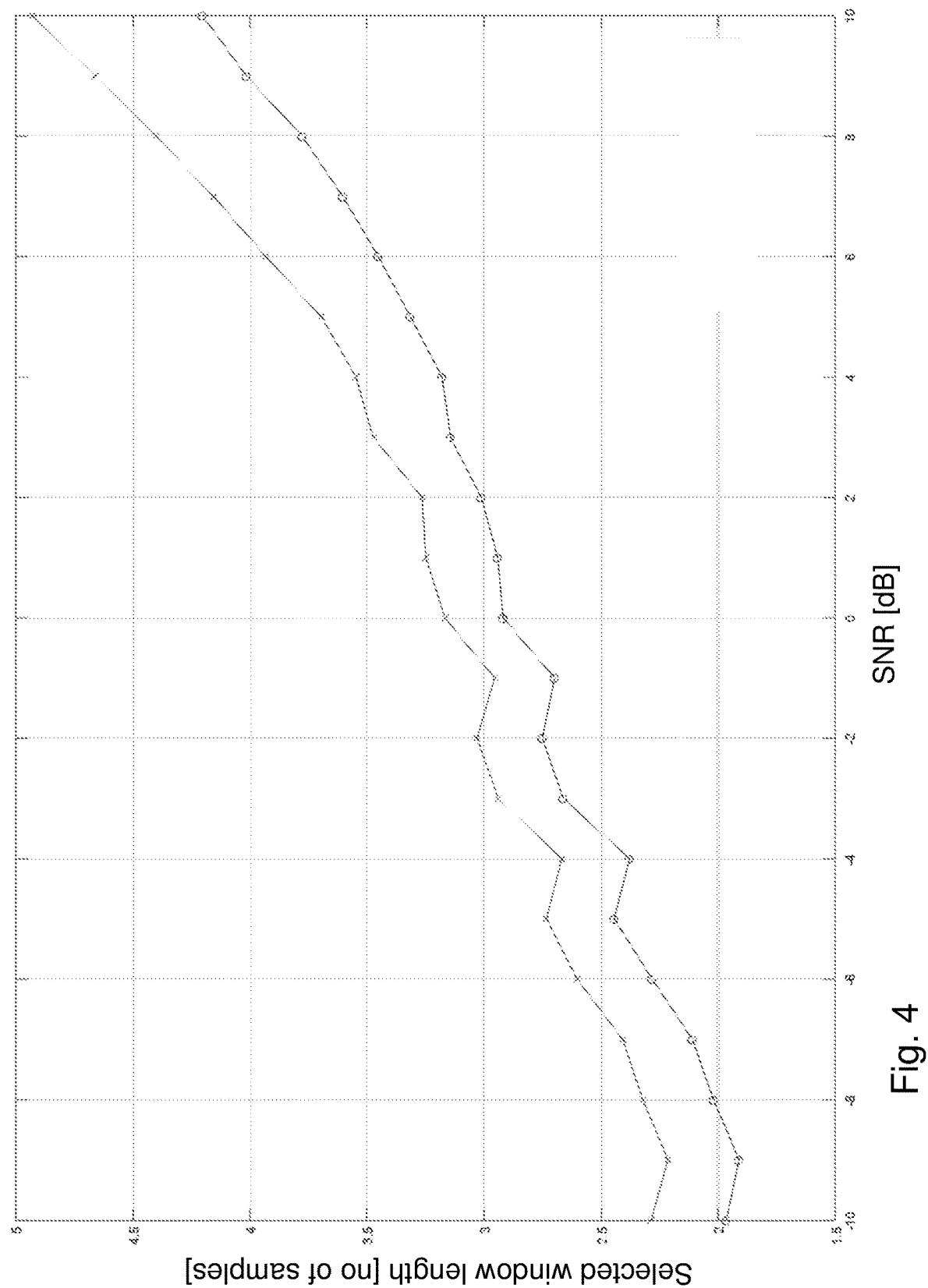
FIGS. 4-6 are diagrams depicting simulation results.
Figure 5:
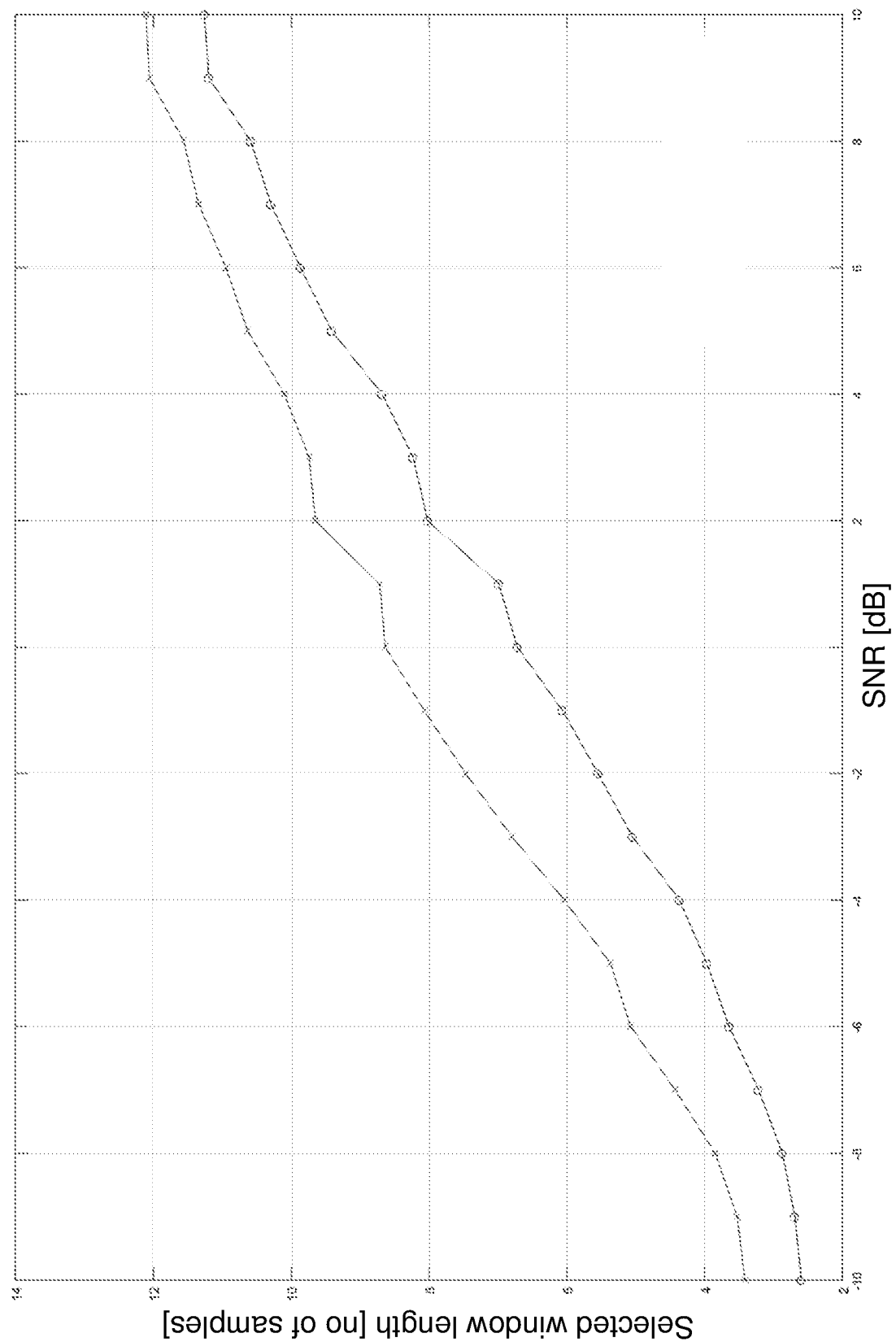

FIGS. 4-5 show diagrams depicting Monte Carlo simulation results. FIGS. 4-5 shows the average selected window length in a channel estimator based on Discrete Cosine Transform, DCT, i.e. a transform-based channel estimator, for two different RS configurations comprising different DMRS densities. The evaluation of the simulation was performed using a the 3GPP TDL-A channel model with 30 ns delay spread in FIG. 4 and with 300 ns delay spread in FIG. 5. From the diagrams in FIGS. 4-5 depicting the average selected window length on the y-axis and the Signal-to-Noise, SNR, ratio on the x-axis, it is noted that the DMRS density has a very clear impact on the selected window length in the transform-based channel estimator. This means that the selected number of used transform coefficients in the transform-based channel estimator is significantly correlated with the DMRS density. This indicates that the selected number of used transform coefficients is a good measurement to use when determining whether the DMRS density is too low or too high. Hence, it may be concluded that this measurement is a suitable measurement to use when determining whether a RS configuration should be modified or not, as in accordance with the embodiments described herein.

Figure 6:
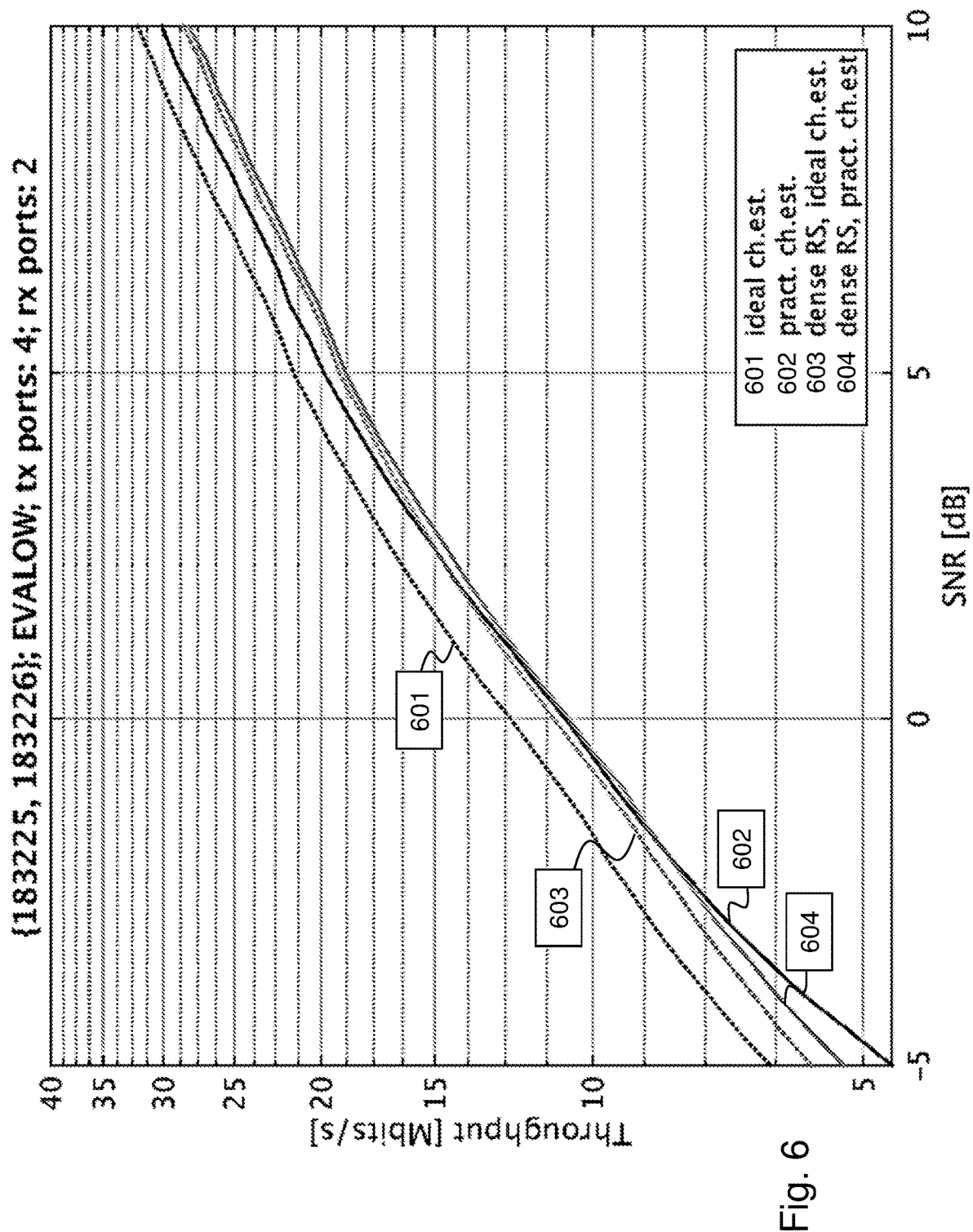

FIG. 6 shows a diagram illustrating ideal channel estimation 601, 603 (dotted lines) vs. practical channel estimation 602, 604 (fully drawn lines) from received transmissions comprising RS configurations having both low and high DMRS densities. The diagram in FIG. 6 illustrates that, in a high SNR environment, the use of a high DM RS density 604 will result in a reduced throughput as compared to the use of a low DMRS density 602. This means that, in a high SNR environment, the dense DMRS density 604 will cost more in terms of overhead than the gain such a dense DMRS density 604 may lead to. The diagram in FIG. 6 further illustrates that, in a low SNR environment, the use of a high DM RS density 604 will result in an increased throughput as compared to the use of a low DMRS density 602. It may thus be concluded that the most suitable DMRS density to use in a RS configuration will depend on current SNR.

Figure 7:
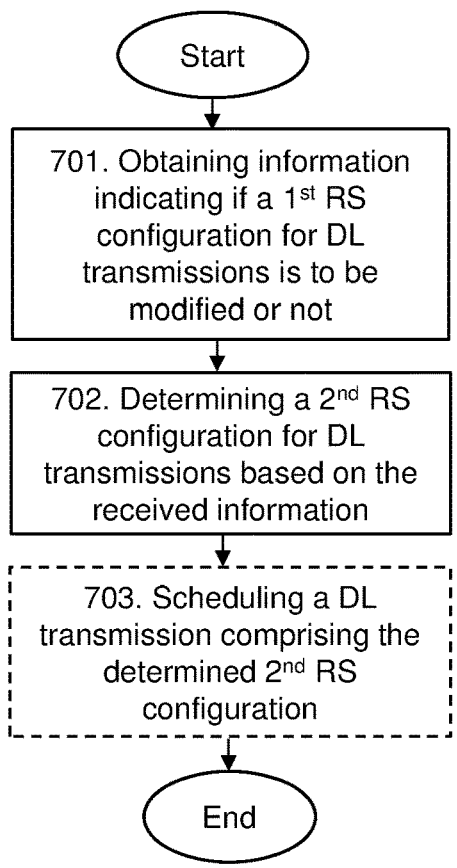
FIG. 7 is a flowchart depicting embodiments of a method in a network node for DL transmissions.

Embodiments of a method performed by a network node 110 for determining a RS configuration for DL transmissions in a wireless communications network 100 will now be described with reference to the flowchart depicted in FIG. 7. FIG. 7 is an illustrated example of actions or operations which may be performed by a network node 110 in the wireless communication network 100.

Action 701. The network node 110 may obtain information indicating if a first RS configuration for DL transmissions to a wireless device 121 is to be modified or not. This may, for example, be performed by the network node 110 by receiving the information from the wireless device 121 in the wireless communications network 100. This corresponds to Action 203 described above wherein the wireless device 121 notifies the network node 110 about whether or not the first RS configuration should be modified.

However, optionally, the network node 110 may also obtain the information by interpreting the absence of any received information from the wireless device 121 as an indication of that the first RS configuration for DL transmissions should not be modified. In some embodiments, the information may comprise a channel estimate quality indicator and/or other information indicating that the amount of transmission resources allocated to RS is to be increased or decreased, or maintained for DL transmissions.

Action 702. After obtaining the information in Action 701, the network node 110 may determine a second RS configuration for DL transmissions to the wireless device 121 based on the received information. This means that the network node 110 may, based on the obtained information, determine a new RS configuration for DL transmissions to the wireless device 121.

In some embodiments, the network node 110 may determine that the amount of transmission resources allocated to RS in the second RS configuration as compared to the first RS configuration may be increased or decreased. Optionally, the network node 110 may determine that the first RS configuration may be maintained for the DL transmissions to the wireless device 121. In this case, the amount of transmission resources allocated to RS in the second RS configuration may be equal to the amount of transmission resources allocated to RS in the first RS configuration, i.e. the second RS configuration may be the same as the first RS configuration. According to some embodiments, the amount of transmission resources allocated to RS corresponds to one or more of: a number of Resource Elements, REs, allocated to symbols of the RS; a transmit power allocation for one or more of the symbols of the RS; and a coding level used for the symbols of the RS. This means that the network node 110 is able to modify, not only the RS density in the second RS configuration, but also other parameters, such as, the power and coding level of the RS symbols in DL transmissions to the wireless device 121 in view of the obtained information. One example of this is the RS configuration shown in FIG. 3D. Here, some REs are allocated to RS symbols but not used for carrying RS symbols. These REs are left un-used in order to instead be used for boosting the power of other REs which do comprise RS symbols.

Action 703. Optionally, after determining the second RS configuration in Action 702, the network node 110 may schedule a DL transmission to the wireless device 121 based on the determined second RS configuration.

Figure 8:
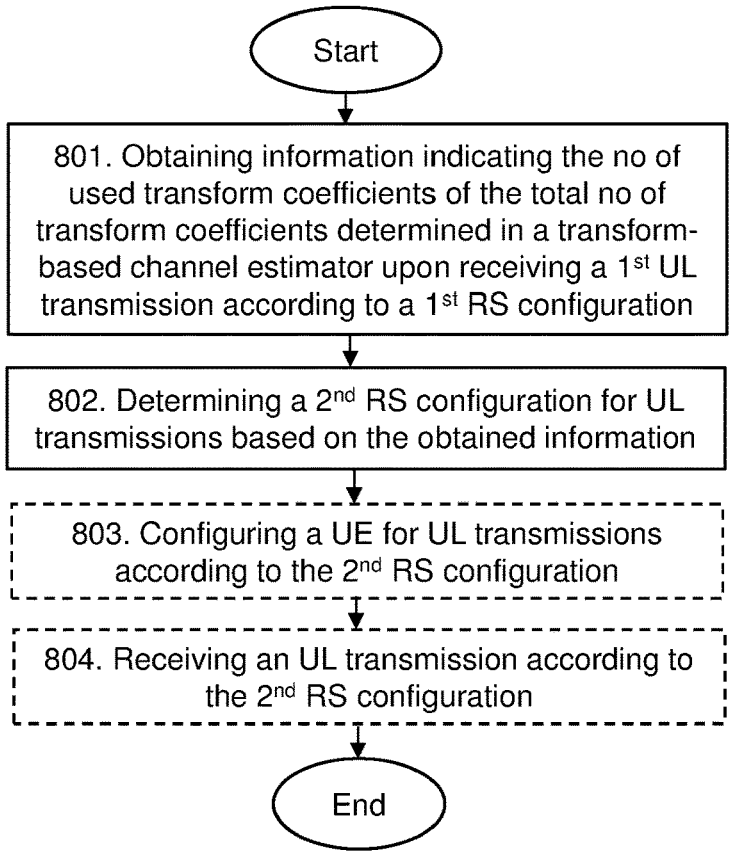
FIG. 8 is another flowchart depicting embodiments of a method in a network node for UL transmissions.

Example of embodiments of a method performed by a network node 110 for enabling a determination of a RS configuration for UL transmissions in a wireless communications network 100 will now be described with reference to the flowchart depicted in FIG. 8. FIG. 8 is an illustrated example of actions or operations which may be performed by a network node 110 in the wireless communication network 100. It should also be noted that prior to Action 801, the network node 110 may receive a first UL transmission. Upon receiving the first UL transmission, the network node 110 may perform demodulation and filtering of the RS comprised in the first UL transmission according to the current RS configuration. Then, the network node 110 may perform a channel estimation based on the demodulated and filtered RS. This may be performed by a transform-based channel estimator in the network node 110, e.g. a channel estimator based on FFT or DCT. It should further be noted that the method described below for UL transmissions in the network node 110 is in many ways similar to the method described for DL transmission in the wireless device 121 with reference to FIG. 2.

Action 801. The network node 110 obtains information indicating the number of used transform coefficients of the total number of transform coefficients determined in a transform-based channel estimator in the network node 110 upon receiving a UL transmission according to a first RS configuration. This means, for example, that the network node 110 may utilize the fact that the number of used transform coefficients provide an indication of how well the transform-based channel estimator is able to suppress noise in the DL transmission. The number of used transform coefficients is the transform coefficients filtered out from the total number of transform coefficients as containing signal energy by the transform-based channel estimator, while the transform coefficients not being used are filtered out from the total number of transform coefficients as predominantly containing noise. This filtering may be performed by the transform-based channel estimator by a window length selected in the transform-based channel estimator in the network node 110. The window length may be selected by the transform-based channel estimator based on a classification of the transform coefficients as containing either signal energy or predominantly noise. This may be performed by using the Aikake information criteria or similar. Thus, the number of used transform coefficients is given by the selected window length of the transform-based channel estimator. Hence, in some embodiments, the number of used transform coefficients may be based on a window length selected in the transform-based channel estimator in the network node 110.

In some embodiments, the network node 110 may determine a channel estimate quality indicator which indicates how well the channel estimate of the transform-based channel estimator corresponds to the actual channel. Here, it should be noted that the channel estimate quality indicator may, in addition to being based on the number of used transform coefficients/window length in the transform-based channel estimator, further also be based on additional factors. For example, results from other filtering steps in the transform-based channel estimator may be used to determine an overall processing gain of the transform-based channel estimator, which may then be used to determine a channel estimate quality indicator. In some embodiments, the channel estimate quality indicator may be based on the number of used transform coefficients and the total number of transform coefficients determined in the transform-based channel estimator. One example of such a channel estimate quality indicator may, for example, be the ratio between the number of used transform coefficients and the total number of transform coefficients.

Optionally, in some embodiments, the network node 110 may determine the channel estimate quality indicator further based on one or more previous numbers of used transform coefficients in the transform-based channel estimator obtained upon receiving other DL transmissions prior to the first DL transmission. This means that historic data or values of the number of used transform coefficients/window lengths in the transform-based channel estimator when processing previous UL transmission, i.e. UL transmissions received by the network node 110 before the first UL transmission, also may be used to determine the channel estimate quality indicator. For example, the historic data or values of the number of used transform coefficients may be weighted in together with the current number of used transform coefficients when determining the channel estimate quality indicator. Also, according to another example, a self-learning operation or algorithm may be employed which may consider both current data or value of the number of used transform coefficients along with the historic data or values of the number of used transform coefficients when determining the channel estimate quality indicator.

In some embodiments, in case the first RS configuration is such that the RS is present at multiple time instances and the number of used transform coefficients in the transform-based channel estimator is selected per time instance, the network node 110 may use the number of used transform coefficients selected in each of these time instances when determining the channel estimate quality indicator. The multiple time instances may, for example, be two or more OFDM symbols within a resource block, a slot, and/or a subframe.

Action 802. After obtaining the information in Action 801, the network node 110 determines a second RS configuration for UL transmissions in the wireless communications network 100 based on the obtained information. This means that the network node 110 may determine that the first RS configuration for UL transmission should be modified, or not, based on the obtained information in Action 801. This also means that an existing quantity, i.e. the number of used transform coefficients or a channel estimate quality indicator determined based thereon, may be used in order to determine if the amount of transmission resources of the first RS configuration, e.g. the number of DMRS symbols, should be modified or not.

In some embodiments, the network node 110 may determine that the amount of transmission resources allocated to RS in the second RS configuration as compared to the first RS configuration is to be increased or decreased. Optionally, the network node 110 may determine that the first RS configuration may be maintained for UL transmissions to the wireless device 121. In this case, the amount of transmission resources allocated to RS in the second RS configuration may be equal to the amount of transmission resources allocated to RS in the first RS configuration, i.e. the second RS configuration may be the same as the first RS configuration. In some embodiments, the amount of transmission resources allocated to RS may correspond to one or more of: a number of Resource Elements, REs, allocated to symbols of the RS; a transmit power allocation for one or more of the symbols of the RS; and a coding level used for the symbols of the RS. This means that the network node 110 may determine which transmission resources allocated to RS that it considers is needed to be modified for UL transmissions, such as, e.g. the RS density, the RS power, or the coding level of the RS symbols.

Action 803. After determining the second RS configuration in Action 802, the network node 110 configures the wireless device 121 for UL transmissions according to the determined second RS configuration. This may, for example, be performed by transmitting information to the wireless device 121 indicating that the determined second RS configuration is to be used for UL transmissions. This means that the information may comprise an indicator identifying the determined second RS configuration among a set of preconfigured RS configurations in the wireless device 121. The information may also comprise the determined second RS configuration.

Action 804. Optionally, after configuring the wireless device 121 with the determined second RS configuration in Action 803, the network node 110 may receive one or more UL transmissions from the wireless device 121 based on the determined second RS configuration for UL transmissions.

Figure 9:
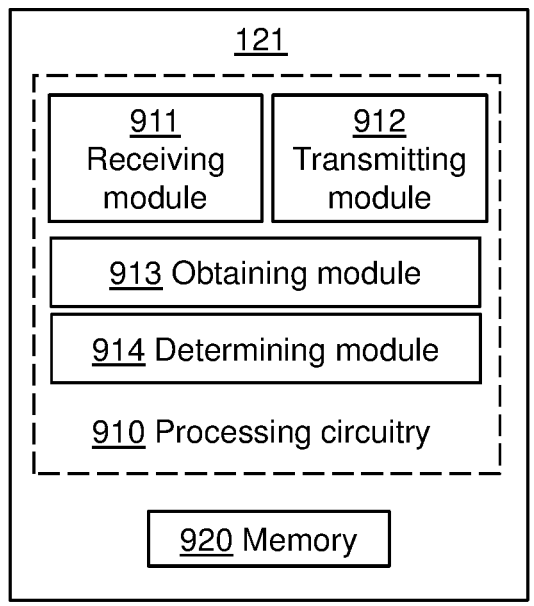
FIG. 9 is a block diagram depicting embodiments of a wireless device.

To perform the method actions in the wireless device 121 for enabling a determination of a RS configuration for DL transmissions in a wireless communications network 100, the wireless device 121 may comprise the following arrangement depicted in FIG. 9. FIG. 9 shows a schematic block diagram of embodiments of a wireless device 121. The wireless device 121 may comprise processing circuitry 910, a memory 920 and at least one antenna (not shown). The processing circuitry 910 may also comprise a receiving module 911 and a transmitting module 912. The receiving module 911 and the transmitting module 912 may comprise Radio Frequency, RF, circuitry and baseband processing circuitry capable of receiving and transmitting a radio signal in the wireless communications network 100. The receiving module 911 and the transmitting module 912 may also form part of a single transceiver. It should also be noted that some or all of the functionality described in the embodiments above as being performed by the wireless device 121 may be provided by the processing circuitry 910 executing instructions stored on a computer-readable medium, such as, e.g. the memory 920 shown in FIG. 9. Alternative embodiments of the wireless device 121 may comprise additional components, such as, for example, an obtaining module 913 and a determining module 914, which each may be responsible for providing its respective functionality necessary to support the embodiments described herein.

The wireless device 121 or processing circuitry 910 is configured to, or may comprise an obtaining module 913 configured to, obtain information indicating the number of used transform coefficients of the total number of transform coefficients determined in a transform-based channel estimator in the wireless device 121 upon receiving a first DL transmission according to a first RS configuration. Also, the wireless device 121 or processing circuitry 910 is configured to, or may comprise a determining module 914 configured to, determine, based on the obtained information, if the first RS configuration for DL transmissions to the wireless device 121 is to be modified or not. In some embodiments, the number of used transform coefficients may be based on a window length selected in the transform-based channel estimator in the wireless device 121.

In some embodiments, the wireless device 121 or processing circuitry 910 may be configured to, or may comprise the obtaining module 913 configured to, determine a channel estimate quality which indicates how well the channel estimate of the transform-based channel estimator correspond to the actual channel. In some embodiments, the channel estimate quality indicator may be based on the number of used transform coefficients and the total number of transform coefficients determined in the transform-based channel estimator. In some embodiments, the wireless device 121 or processing circuitry 910 may be configured to, or may comprise the obtaining module 913 configured to, determine the channel estimate quality indicator further based on one or more previous numbers of used transform coefficients in the transform-based channel estimator obtained upon receiving other DL transmissions prior to the first DL transmission. Also, in some embodiments, the wireless device 121 or processing circuitry 910 may be configured to, or may comprise the determining module 914 configured to, determine that the first RS configuration is to be modified such that an increased or decreased amount of transmission resources is allocated to RS, or maintained for DL transmissions. In some embodiments, the amount of transmission resources allocated to RS may correspond to one or more of: a number of Resource Elements, REs, allocated to symbols of the RS; a transmit power allocation for one or more of the symbols of the RS; and a coding level used for the symbols of the RS. Further, in some embodiments, the wireless device 121 or processing circuitry 910 may be configured to, or may comprise the transmitting module 912 configured to, transmit information indicating if the first RS configuration is to be modified or not to a network node 110 of the wireless communications network 100. In some embodiments, the transmitted information may comprise a channel estimate quality indicator and/or other information indicating that the amount of transmission resources allocated to RS is to be increased or decreased, or maintained for DL transmissions. Furthermore, the embodiments for enabling a determination of a RS configuration for DL transmissions in a wireless communications network 100 described above may be implemented through one or more processors, such as the processing circuitry 910 in the wireless device 121 depicted in FIG. 9, together with computer program code for performing the functions and actions of the embodiments herein. The computer program code mentioned above may also be provided as a computer program or computer program product, for instance in the form of a data carrier carrying computer program code or code means for performing the embodiments herein when being loaded into the processing circuitry 910 in the wireless device 121. The computer program code may e.g. be provided as pure program code in the wireless device 121 or on a server and downloaded to the wireless device 121. Thus, it should be noted that the modules of the wireless device 121 may in some embodiments be implemented as computer programs stored in memory, e.g. in the memory modules 920 in FIG. 9, for execution by processors or processing modules, e.g. the processing circuitry 910 of FIG. 9. Also, the data carrier may be one of an electronic signal, optical signal, radio signal, or computer-readable storage medium.

Those skilled in the art will also appreciate that the processing circuitry 910 and the memory 920 described above may refer to a combination of analog and digital circuits, and/or one or more processors configured with software and/or firmware, e.g. stored in a memory, that when executed by the one or more processors such as the processing circuitry 920 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

Figure 10:
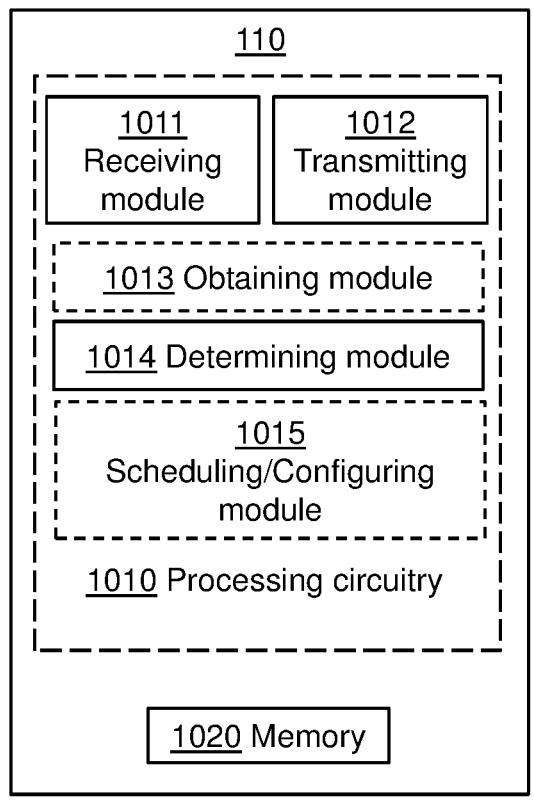
FIG. 10 is a block diagram depicting embodiments of a network node, FIG. 11 schematically illustrates a telecommunication network connected via an intermediate network to a host computer.

To perform the method actions in the network node 110 for determining a RS configuration for DL and/or UL transmissions in a wireless communications network 100, the network node 110 may comprise the following arrangement depicted in FIG. 10. FIG. 10 shows a schematic block diagram of embodiments of a network node 110. The network node 110 may comprise processing circuitry 1010, a memory 1020 and at least one antenna (not shown). The processing circuitry 1010 may also comprise a receiving module 1011 and a transmitting module 1012. The receiving module 1011 and the transmitting module 1012 may comprise Radio Frequency, RF, circuitry and baseband processing circuitry capable of receiving and transmitting a radio signal in the wireless communications network 100. The receiving module 1011 and the transmitting module 1012 may also form part of a single transceiver. It should also be noted that some or all of the functionality described in the embodiments above as being performed by the wireless device 121 may be provided by the processing circuitry 1010 executing instructions stored on a computer-readable medium, such as, e.g. the memory 1020 shown in FIG. 10. Alternative embodiments of the network node 110 may comprise additional components, such as, for example, an obtaining module 1013, a determining module 1014, and a scheduling or configuring module 1015, which each may responsible for providing its respective functionality necessary to support the embodiments described herein.

For DL transmissions, the network node 110 or processing circuitry 1010 is configured to, or may comprise a obtaining module 1013 configured to, obtain information indicating if a first RS configuration for DL transmissions to a wireless device 121 is to be modified or not. Also, the network node 110 or processing circuitry 1010 is configured to, or may comprise the determining module 1014 configured to, determine a second RS configuration for DL transmissions to the wireless device 121 based on the received information. In some embodiments, the network node 110 or processing circuitry 1010 may be configured to, or may comprise the receiving module 1011 configured to, receive the information from the wireless device 121. In some embodiments, the information comprise a channel estimate quality indicator and/or other information indicating that the amount of transmission resources allocated to RS is to be increased or decreased, or maintained for DL transmissions. Also, in some embodiments, the network node 110 or processing circuitry 1010 may be configured to, or may comprise the determining module 1014 configured to, determine that the amount of transmission resources allocated to RS in the second RS configuration as compared to the first RS configuration is to be increased or decreased, or that the first RS configuration is to be maintained for the DL transmissions, whereby the amount of transmission resources allocated to RS in the second RS configuration is equal to the amount of transmission resources allocated to RS in the first RS configuration. In some embodiments, the amount of transmission resources allocated to RS corresponds to one or more of: a number of Resource Elements, REs, allocated to symbols of the RS; a transmit power allocation for one or more of the symbols of the RS; and a coding level used for the symbols of the RS. Further, in some embodiments, the network node 110 or processing circuitry 1010 may be configured to, or may comprise the scheduling or configuring module 1015 configured to, schedule a DL transmission to the wireless device 121 based on the determined second RS configuration. For UL transmissions, the network node 110 or processing circuitry 1010 is configured to, or may comprise the obtaining module 1013 configured to, obtain information indicating the number of used transform coefficients of the total number of transform coefficients determined in a transform-based channel estimator in the network node 110 upon receiving a UL transmission according to a first RS configuration. Also, the network node 110 or processing circuitry 1010 is configured to, or may comprise the determining module 1014 configured to, determine a second RS configuration for UL transmissions in the wireless communications network 100 based on the obtained information. Further, the network node 110 or processing circuitry 1010 is configured to, or may comprise the scheduling or configuring module 1015 configured to, configure a wireless device 121 for UL transmissions according to the determined second RS configuration. Also, in some embodiments, the network node 110 or processing circuitry 1010 may be configured to, or may comprise the determining module 1014 configured to, determine that the amount of transmission resources allocated to RS in the second RS configuration as compared to the first RS configuration is to be increased or decreased, or that the first RS configuration is to be maintained for the UL transmissions, whereby the amount of transmission resources allocated to RS in the second RS configuration is equal to the amount of transmission resources allocated to RS in the first RS configuration. In some embodiments, the amount of transmission resources allocated to RS corresponds to one or more of: a number of Resource Elements, REs, allocated to symbols of the RS; a transmit power allocation for one or more of the symbols of the RS; and a coding level used for the symbols of the RS. Further, in some embodiments, the network node 110 or processing circuitry 1010 may be configured to, or may comprise the receiving module 1011 configured to, receive one or more UL transmissions from the wireless device 121 based on the determined second RS configuration for UL transmissions. Furthermore, in some embodiments, the network node 110 or processing circuitry 1010 may be configured to, or may comprise the obtaining module 1013 configured to, determine a channel estimate quality which indicates how well the channel estimate of the transform-based channel estimator correspond to the actual channel. In some embodiments, the channel estimate quality indicator may be based on the number of used transform coefficients and the total number of transform coefficients determined in the transform-based channel estimator. In some embodiments, the network node 110 or processing circuitry 1010 may be configured to, or may comprise the obtaining module 1013 configured to, determine the channel estimate quality indicator further based on one or more previous numbers of used transform coefficients in the transform-based channel estimator obtained upon receiving other UL transmissions prior to the first UL transmission. In some embodiments, the number of used transform coefficients may be provided by a window length selected in the transform-based channel estimator in the wireless device 121. Furthermore, the embodiments for determining a RS configuration for DL transmissions and/or UL transmissions in a wireless communications network 100 described above may be implemented through one or more processors, such as the processing circuitry 1010 in the network node 110 depicted in FIG. 10, together with computer program code for performing the functions and actions of the embodiments herein. The computer program code mentioned above may also be provided as a computer program or computer program product, for instance in the form of a data carrier carrying computer program code or code means for performing the embodiments herein when being loaded into the processing circuitry 1010 in the network node 110. The computer program code may e.g. be provided as pure program code in the network node 110 or on a server and downloaded to the network node 110. Thus, it should be noted that the modules of the network node 110 may in some embodiments be implemented as computer programs stored in memory, e.g. in the memory modules 1020 in FIG. 10, for execution by processors or processing modules, e.g. the processing circuitry 1010 of FIG. 10. Also, the data carrier may be one of an electronic signal, optical signal, radio signal, or computer-readable storage medium.

Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1020 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

Additional Aspects

According to a first additional aspect of the embodiments described herein, it is also presented a method implemented in a communication system including a host computer, a base station and a user equipment (UE), the method comprising: at the host computer, receiving user data transmitted to the base station from the UE, wherein the UE obtains information indicating the number of used transform coefficients of the total number of transform coefficients determined in a transform-based channel estimator in the UE upon receiving a first downlink transmission according to a first reference signal configuration, and determines, based on the obtained information, if the first reference signal configuration for downlink transmissions to the UE is to be modified or not. The method may further comprise: at the UE, providing the user data to the base station. Also, the method may further comprise: at the UE, executing a client application, thereby providing the user data to be transmitted; and at the host computer, executing a host application associated with the client application. Further, the method may further comprise: at the UE, executing a client application; and at the UE, receiving input data to the client application, the input data being provided at the host computer by executing a host application associated with the client application wherein the user data to be transmitted is provided by the client application in response to the input data.

According to a second additional aspect of the embodiments described herein, it is also presented a communication system including a host computer comprising: a communication interface configured to receive user data originating from a transmission from a user equipment (UE) to a base station, wherein the UE comprises a radio interface and processing circuitry, the UE's processing circuitry configured to: obtain information indicating the number of used transform coefficients of the total number of transform coefficients determined in a transform-based channel estimator in the UE upon receiving a first downlink transmission according to a first reference signal configuration, and determine, based on the obtained information, if the first reference signal configuration for downlink transmissions to the UE is to be modified or not. The communication system may further include the UE. Also, the communication system may further include the base station, wherein the base station comprises a radio interface configured to communicate with the UE and a communication interface configured to forward to the host computer the user data carried by a transmission from the UE to the base station. Further, in the communication system, the processing circuitry of the host computer may be configured to execute a host application; and the UE's processing circuitry may be configured to execute a client application associated with the host application, thereby providing the user data. Additionally, in the communication system, the processing circuitry of the host computer may be configured to execute a host application, thereby providing request data; and the UE's processing circuitry may be configured to execute a client application associated with the host application, thereby providing the user data in response to the request data.

According to a third additional aspect of the embodiments described herein, it is also presented a method implemented in a communication system including a host computer, a base station and a user equipment (UE), the method comprising: at the host computer, receiving, from the base station, user data originating from a transmission which the base station has received from the UE, wherein the base station obtain information indicating if a first reference signal configuration for downlink transmissions to a UE is to be modified or not, and determine a second reference signal configuration for downlink transmissions to the UE based on the received information. The method may further comprise: at the base station, receiving the user data from the UE. Also, the method may further comprise: at the base station, initiating a transmission of the received user data to the host computer.

According to a fourth additional aspect of the embodiments described herein, it is also presented a communication system including a host computer comprising a communication interface configured to receive user data originating from a transmission from a user equipment (UE) to a base station, wherein the base station comprises a radio interface and processing circuitry, the base station's processing circuitry configured to obtain information indicating if a first reference signal configuration for downlink transmissions to a UE is to be modified or not, and determine a second reference signal configuration for downlink transmissions to the UE based on the received information. The communication system may further include the base station. Also, the communication system may further include the UE, wherein the UE is configured to communicate with the base station.

Further, in the communication system, the processing circuitry of the host computer may be configured to execute a host application; and the UE may be configured to execute a client application associated with the host application, thereby providing the user data to be received by the host computer.

According to a fifth additional aspect of the embodiments described herein, it is also presented a method implemented in a communication system including a host computer, a base station and a user equipment (UE), the method comprising: at the host computer, providing user data; and at the host computer, initiating a transmission carrying the user data to the UE via a cellular network comprising the base station, wherein the base station obtains information indicating the number of used transform coefficients of the total number of transform coefficients determined in a transform-based channel estimator in the network node 110 upon receiving an uplink transmission according to a first reference signal configuration, determines a second reference signal configuration for uplink transmissions in the wireless communications network 100 based on the obtained information, and configures a UE for uplink transmissions according to the determined second reference signal configuration. The method may further comprise: at the base station, transmitting the user data. Also, the user data may be provided at the host computer by executing a host application, and the method further comprise: at the UE, executing a client application associated with the host application.

According to a sixth additional aspect of the embodiments described herein, it is also presented a communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to obtain information indicating the number of used transform coefficients of the total number of transform coefficients determined in a transform-based channel estimator in the network node 110 upon receiving an uplink transmission according to a first reference signal configuration, determine a second reference signal configuration for uplink transmissions in the wireless communications network 100 based on the obtained information, and configure a UE for uplink transmissions according to the determined second reference signal configuration. The communication system may further including the base station. Also, the communication system may further include the UE, wherein the UE is configured to communicate with the base station. Further, in the communication system, the processing circuitry of the host computer may be configured to execute a host application, thereby providing the user data; and the UE may comprise processing circuitry configured to execute a client application associated with the host application.

Figure 11:
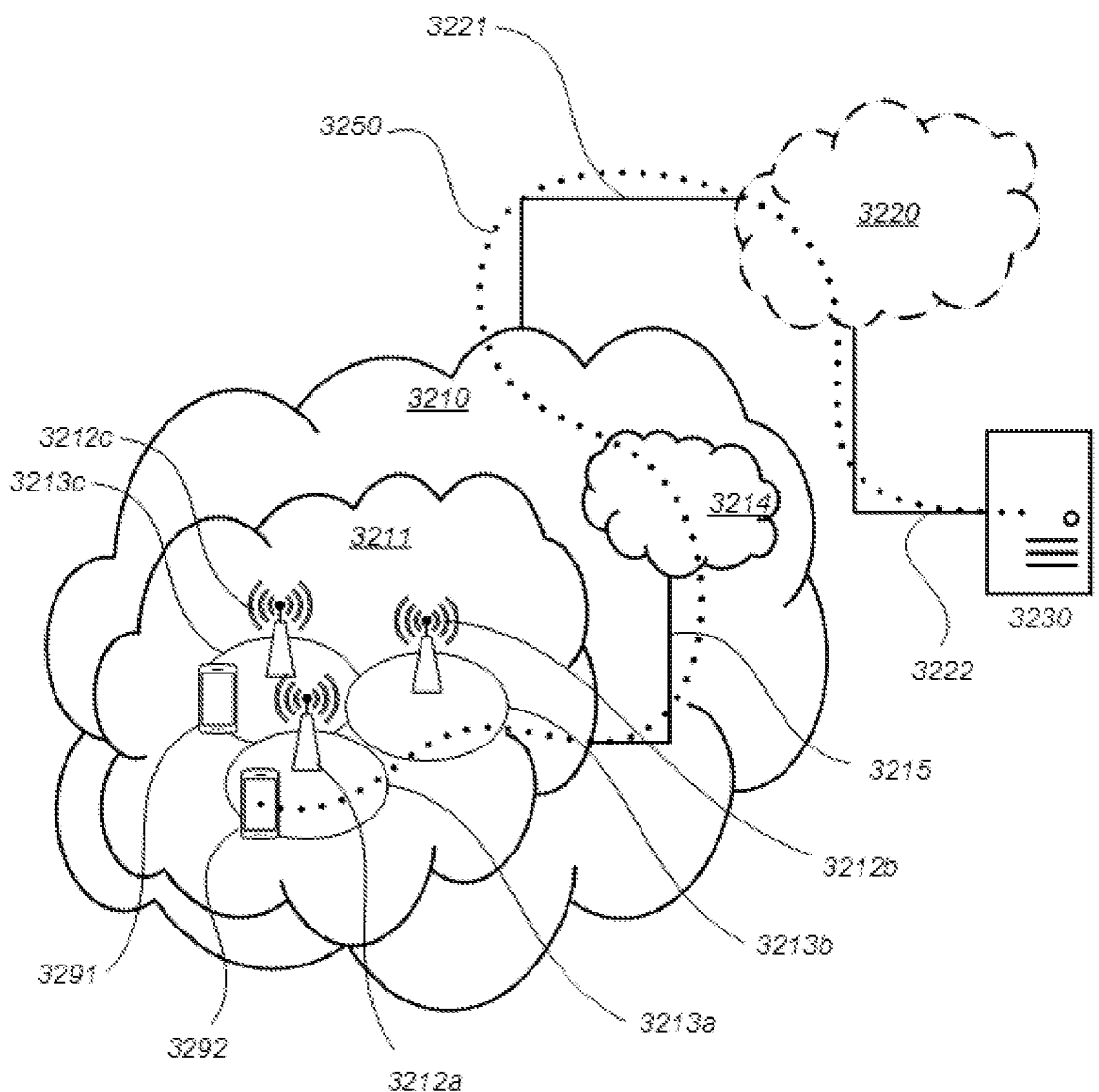

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
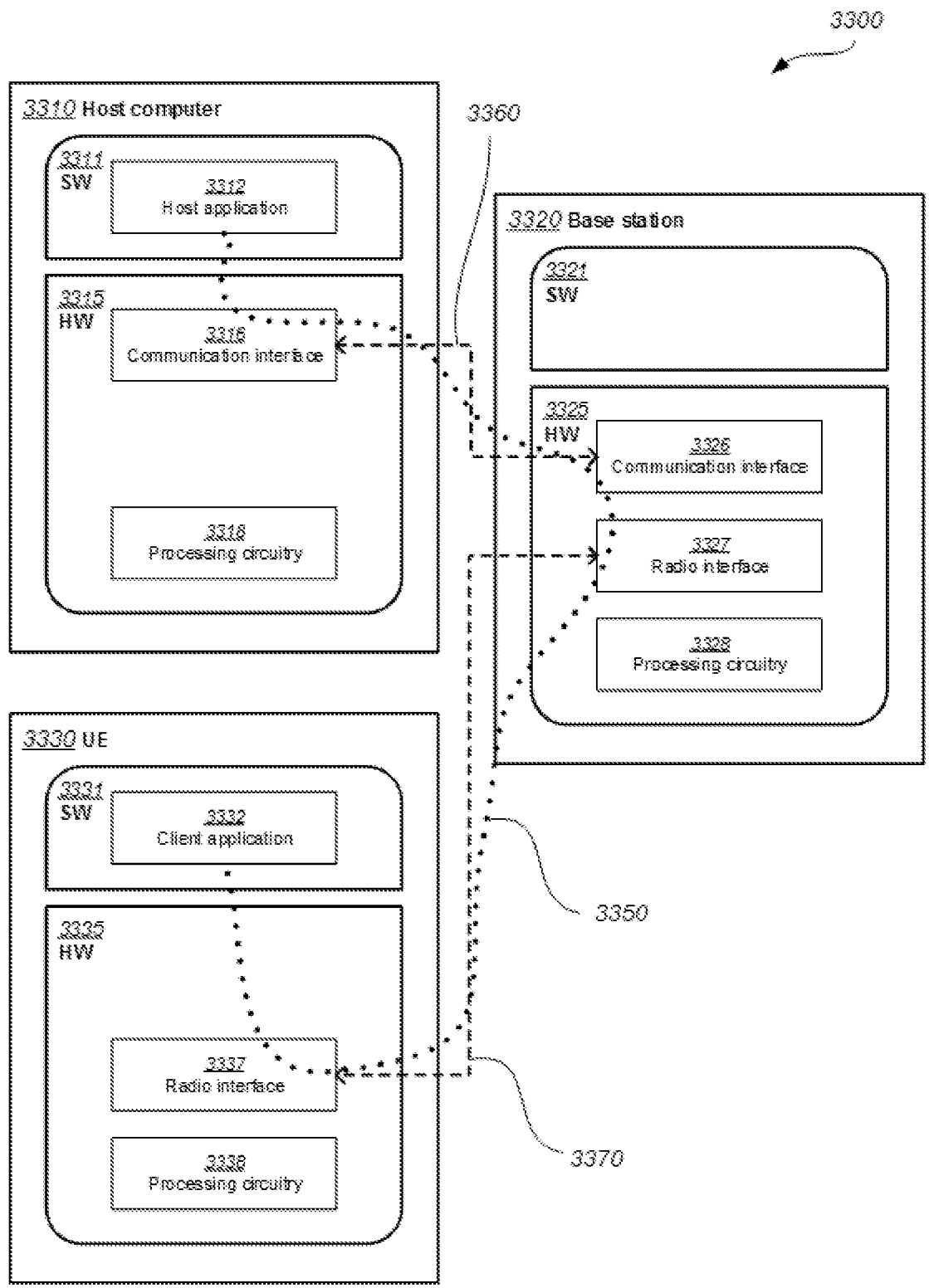
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may provide an improved determination of RS configurations which comprise a low overhead signalling with maintained good channel estimation performance and increased throughput. Thereby, the improved determination of RS configurations also provide benefits such as providing more reliable and robust applications and use thereof.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
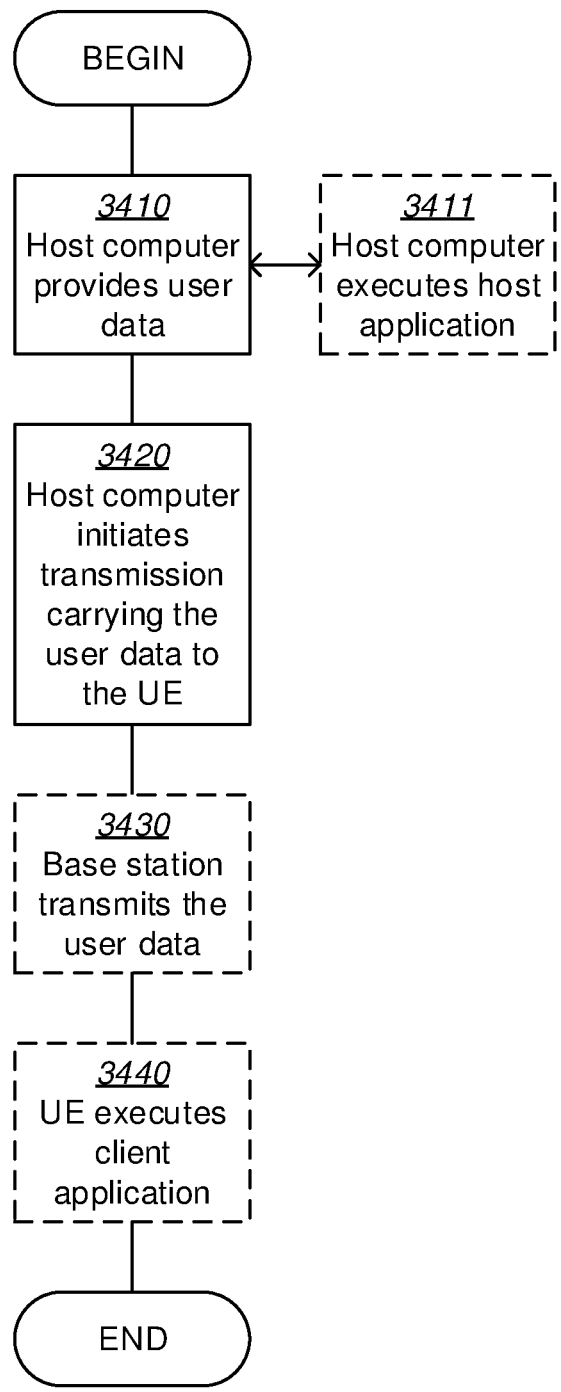
FIGS. 13-15 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figures 14, 15:
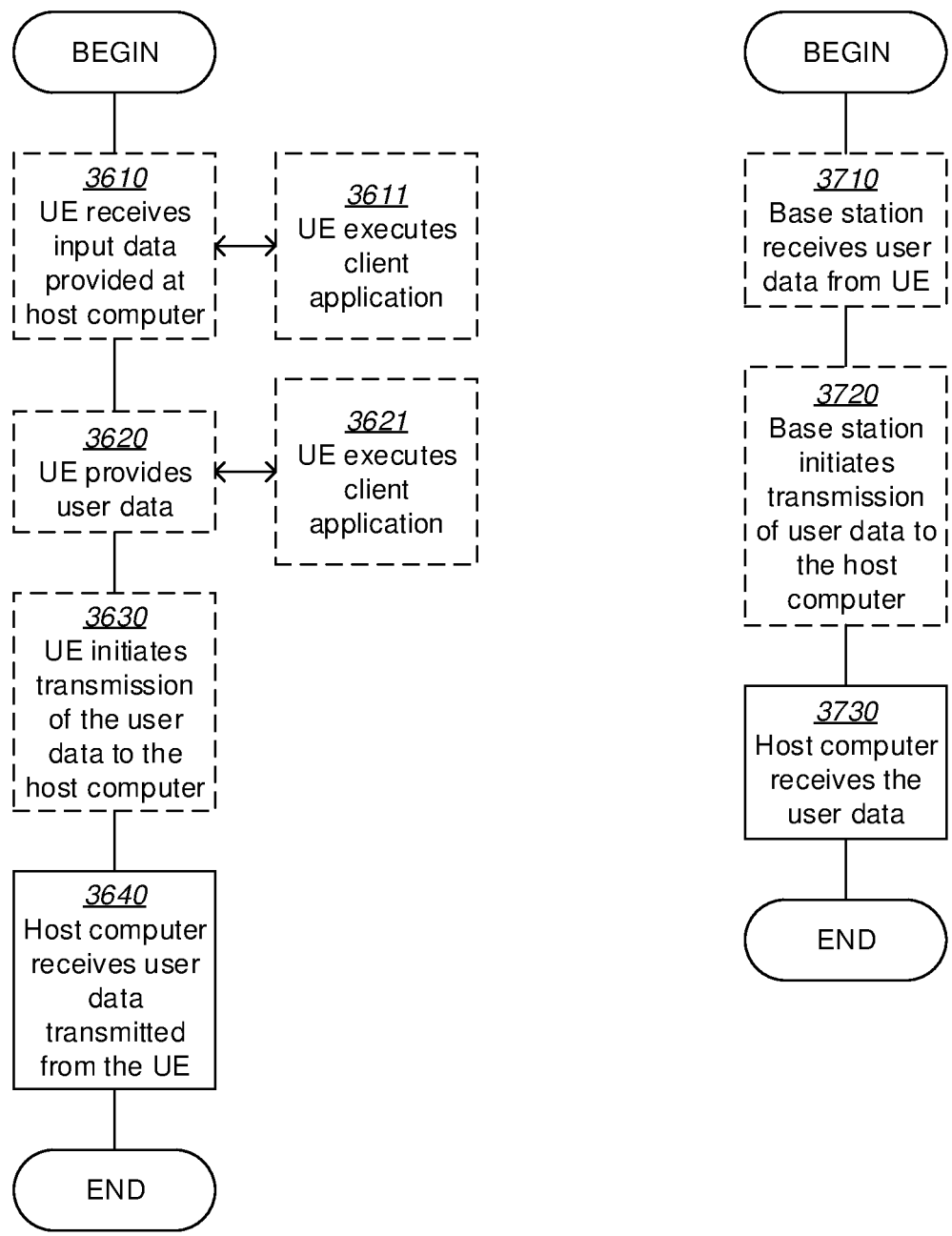

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

RS Reference Signal
DMRS Demodulation Reference Signal
SRS Sounding Reference Signal
CSI-RS Channel State Information-RS
TRS Tracking Reference Signal
PT-RS Phase Tracking Reference Signal
FFT Fast-Fourier Transform
CRS Common Reference Signal
DCT Discrete Cosine Transform
TTI Time Transmission Interval
mMTC Massive-Machine Type Communication
CSI Channel State Information
OFDM Orthogonal Frequency-Division Multiplexing
SNR Signal-to-Noise Ratio

The invention claimed is:

1. A method performed by a wireless device for enabling a determination of a reference signal configuration for downlink transmissions in a wireless communications network, the method comprising:
   obtaining information indicating a number of used transform coefficients of a total number of transform coefficients determined in a transform-based channel estimator in the wireless device upon receiving a first downlink transmission according to a first reference signal configuration; and
   determining, based on the obtained information, if the first reference signal configuration for downlink transmissions to the wireless device is to be modified or not.

2. The method according to claim 1, wherein the number of used transform coefficients is determined based on a window length selected in the transform-based channel estimator in the wireless device.

3. The method according to claim 1, further comprising determining a channel estimate quality indicator which indicates how well the channel estimate of the transform-based channel estimator corresponds to an actual channel.

4. The method according to claim 3, wherein the channel estimate quality indicator is based on the number of used transform coefficients and the total number of transform coefficients determined in the transform-based channel estimator or on one or more previous numbers of used transform coefficients in the transform-based channel estimator obtained upon receiving other downlink transmissions prior to the first downlink transmission.

5. The method according to claim 1, further comprising determining that the first reference signal configuration is to be modified such that an increased or decreased amount of transmission resources is allocated to reference signals, or maintained for downlink transmissions.

6. The method according to claim 5, wherein the amount of transmission resources allocated to reference signals corresponds to one or more of: a number of Resource Elements (REs) allocated to symbols of the reference signal; a transmit power allocation for one or more of the symbols of the reference signal; and a coding level used for the symbols of the reference signal.

7. The method according to claim 1, further comprising:
transmitting information indicating if the first reference signal configuration is to be modified or not to a network node of the wireless communications network.

8. The method according to claim 7, wherein the transmitted information comprises at least one of a channel estimate quality indicator or other information indicating that the amount of transmission resources allocated to reference signals is to be increased or decreased, or maintained for downlink transmissions.

9. A wireless device for enabling a determination of a reference signal configuration for downlink transmissions in a wireless communications network, the wireless device being configured to:
obtain information indicating a number of used transform coefficients of a total number of transform coefficients determined in a transform-based channel estimator in the wireless device upon receiving a first downlink transmission according to a first reference signal configuration, and determine, based on the obtained information, if the first reference signal configuration for downlink transmissions to the wireless device is to be modified or not.

10. The wireless device according to claim 9, wherein the number of used transform coefficients is based on a window length selected in the transform-based channel estimator in the wireless device.

11. The wireless device according to claim 9, further configured to determine a channel estimate quality which indicates how well the channel estimate of the transform-based channel estimator correspond to an actual channel.

12. The wireless device according to claim 11, wherein the channel estimate quality indicator is based on the number of used transform coefficients and the total number of transform coefficients determined in the transform-based channel estimator or on one or more previous numbers of used transform coefficients in the transform-based channel estimator obtained upon receiving other downlink transmissions prior to the first downlink transmission.

13. The wireless device according to claim 9, further configured to determine that the first reference signal configuration is to be modified such that an increased or decreased amount of transmission resources is allocated to reference signals, or maintained for downlink transmissions.

14. The wireless device according to claim 13, wherein the amount of transmission resources allocated to reference signals corresponds to one or more of: a number of Resource Elements (REs) allocated to symbols of the reference signal; a transmit power allocation for one or more of the symbols of the reference signal; and a coding level used for the symbols of the reference signal.

15. The wireless device according to claim 9, further configured to transmit information indicating if the first reference signal configuration is to be modified or not to a network node of the wireless communications network, wherein the transmitted information comprises at least one of a channel estimate quality indicator or other information indicating that the amount of transmission resources allocated to reference signals is to be increased or decreased, or maintained for downlink transmissions.

16. A method performed by a network node for determining a reference signal configuration for uplink transmissions in a wireless communications network, the method comprising:
obtaining information indicating a number of used transform coefficients of a total number of transform coefficients determined in a transform-based channel estimator in the network node upon receiving an uplink transmission according to a first reference signal configuration;
determining a second reference signal configuration for uplink transmissions in the wireless communications network based on the obtained information; and
configuring a wireless device for uplink transmissions according to the determined second reference signal configuration.

* * * * *